(12) United States Patent
Shafer et al.

(10) Patent No.: US 10,022,948 B2
(45) Date of Patent: Jul. 17, 2018

(54) COMPOSITE PIPE AND METHOD OF MANUFACTURE

(71) Applicants: Terry C. Shafer, The Woodlands, TX (US); Dustin McWilliams, Spring, TX (US); George Coleman, Texarkana, TX (US)

(72) Inventors: Terry C. Shafer, The Woodlands, TX (US); Dustin McWilliams, Spring, TX (US); George Coleman, Texarkana, TX (US)

( * ) Notice: Subject to any disclaimer, the term of this patent is extended or adjusted under 35 U.S.C. 154(b) by 151 days.

(21) Appl. No.: 14/568,758

(22) Filed: Dec. 12, 2014

(65) Prior Publication Data

US 2015/0096667 A1  Apr. 9, 2015

Related U.S. Application Data

(62) Division of application No. 12/709,095, filed on Feb. 19, 2010, now Pat. No. 8,944,113.

(60) Provisional application No. 61/153,833, filed on Feb. 19, 2009.

(51) Int. Cl.
| | |
|---|---|
| B29C 53/60 | (2006.01) |
| B32B 39/00 | (2006.01) |
| B29C 53/82 | (2006.01) |
| B29D 23/00 | (2006.01) |
| F16L 9/12 | (2006.01) |
| B32B 37/14 | (2006.01) |
| B32B 37/15 | (2006.01) |
| B32B 38/00 | (2006.01) |
| B29C 47/00 | (2006.01) |
| B29L 23/00 | (2006.01) |

(Continued)

(52) U.S. Cl.
CPC ............ *B32B 39/00* (2013.01); *B29C 53/60* (2013.01); *B29C 53/821* (2013.01); *B29D 23/001* (2013.01); *B32B 37/142* (2013.01); *B32B 37/153* (2013.01); *B32B 38/0012* (2013.01); *F16L 9/121* (2013.01); *B29C 47/00* (2013.01); *B29C 47/0023* (2013.01); *B29C 47/0026* (2013.01); *B29C 47/0038* (2013.01); *B29C 47/021* (2013.01); *B29C 47/065* (2013.01); *B29C 53/824* (2013.01); *B29L 2023/22* (2013.01); *B32B 2307/54* (2013.01); *B32B 2307/558* (2013.01); *B32B 2398/20* (2013.01); *B32B 2597/00* (2013.01)

(58) Field of Classification Search
USPC .................................. 156/195, 185, 244.13
See application file for complete search history.

(56) References Cited

U.S. PATENT DOCUMENTS 2,605,202 A * 7/1952 Reynolds ............... B21C 37/154
138/141
2,748,805 A * 6/1956 Winstead ................ B29C 53/60
138/144

(Continued)

FOREIGN PATENT DOCUMENTS

WO    WO-95/07428 A1 *  3/1995

*Primary Examiner* — Jeffrey H Aftergut
(74) *Attorney, Agent, or Firm* — Baker Botts L.L.P.

(57) ABSTRACT

A composite pipe is disclosed. The composite pipe includes a thermoplastic inner layer and a tape layer. The tape layer is exterior to and bonded with the thermoplastic inner layer. The composite pipe also includes a protective layer formed exterior to the tape layer.

4 Claims, 5 Drawing Sheets

(51) Int. Cl.
  *B29C 47/02* (2006.01)
  *B29C 47/06* (2006.01)

(56) References Cited

U.S. PATENT DOCUMENTS 3,740,958 A * 6/1973 Cadwell .................. B29C 47/00
  138/103
3,769,127 A * 10/1973 Goldsworthy ........ B29C 47/023
  156/172
4,010,054 A * 3/1977 Bradt .................... B29C 53/566
  156/173

* cited by examiner

COMPOSITE PIPE AND METHOD OF MANUFACTURE

CROSS-REFERENCE TO RELATED APPLICATION

This application is a divisional of U.S. application Ser. No. 12/709,095, which was filed on Feb. 19, 2010, and claims the benefit of U.S. Provisional Application No. 61/153,833, which was filed Feb. 19, 2009, both of which are hereby incorporated by reference in their entirety.

TECHNICAL FIELD

The present disclosure relates generally to piping and, more particularly, to a composite pipe and a method of manufacturing the same.

BACKGROUND

Field operations involving piping work are conducted in a variety of different locations and involve a variety of piping needs, depending on the particular situations. In many cases, available piping fails to meet particular design requirements, such as desirable ratings of strength, stiffness, impact resistance, strength-to-weight ratios, and resistance to corrosion. In many cases, the requisite piping for different operations is hauled to a work site, where it may be stored until needed. Space available for storage may be a constraint at some work sites. Scheduling of pipe production and/or transport adds a layer of complexity to field operations. The variable piping needs of a particular field operation complicates job planning, and unforeseen custom piping needs disrupt work schedules and job progress. Often, at the end of a particular operation at a work site, excess or unneeded piping may exist. The oversupply may need to be discarded or hauled away from the work site. The logistics involved in designing, scheduling, transporting and storing piping entail significant costs. Thus, there is a need for piping solutions that address these difficulties and for piping with improved characteristics such as strength, stiffness, impact resistance, strength-to-weight ratios, and resistance to corrosion.

SUMMARY

The present disclosure relates generally to piping and, more particularly, to a composite pipe and a method of manufacturing the same.

In one aspect, a composite pipe is disclosed. The composite pipe includes a thermoplastic inner layer and a tape layer. The tape layer is exterior to and bonded with the thermoplastic inner layer. The composite pipe also includes a protective layer formed exterior to the tape layer.

In another aspect, a portable composite pipe manufacturing system is disclosed. The portable composite pipe manufacturing system includes an extruder configured to extrude a thermoplastic material through a die. The portable composite pipe manufacturing system also includes a mandrel configured to receive the thermoplastic material and a wetted tape. The extruder and the mandrel are configured as a portable unit operable to manufacture a composite pipe.

In yet another aspect, a method of manufacturing a composite pipe is disclosed. A thermoplastic material is extruded, at least in part, with an extruder. The thermoplastic material is wound to form a thermoplastic inner layer, at least in part, with a mandrel. A composite tape is wound to form a tape layer exterior to the thermoplastic inner layer, at least in part, with the mandrel. A protective layer is formed exterior to the tape layer, at least in part, with the mandrel. The extruder and the mandrel are configured as a portable unit operable to manufacture a composite pipe.

Certain embodiments of the present invention may provide a portable and adaptable system or method that can accommodate needs for varying sizes, thicknesses, and pressure ratings of piping. A portable composite pipe manufacturing system may accommodate unique and changing piping needs that may depend on the variances of a particular situation. The system may eliminate or reduce the need to predict and design for piping needs that that may or may not be present at a given job site, or that may change during the course of a job. Accordingly, certain embodiments of the present invention may result in lower costs.

These and other features and advantages of the present invention will be apparent to those skilled in the art. While numerous changes may be made by those skilled in the art, such changes are within the spirit of the invention.

BRIEF DESCRIPTION OF THE DRAWINGS

Some specific exemplary embodiments of the disclosure may be understood by referring, in part, to the following description and the accompanying drawings.

While embodiments of this disclosure have been depicted and described and are defined by reference to exemplary embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION

The present disclosure relates generally to piping and, more particularly, to a composite pipe and a method of manufacturing the same. Illustrative embodiments of the present invention are described in detail below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of the present disclosure.

Figure 1:
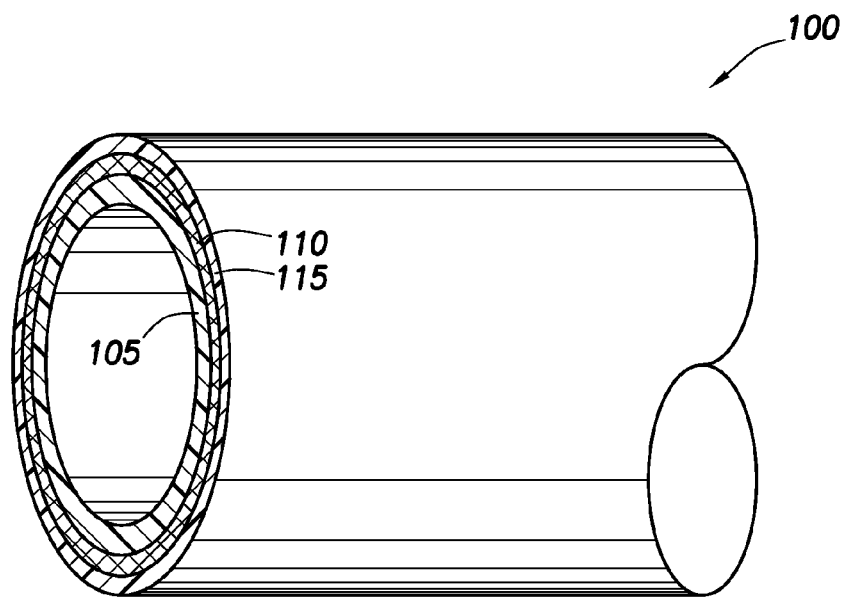
FIG. 1 is a diagram of layers of a composite pipe, in accordance with certain embodiments of the present disclosure.

FIG. 1 is a diagram of layers of a composite pipe 100 in accordance with certain embodiments of the present disclosure. The inner layer 105 of the pipe 100 may be a thermoplastic layer. The middle layer 110 may be a reinforcing composite tape layer, which may include fully wetted tape. The tape of the middle layer 110 may be encased or enclosed in a thermoplastic. The outer protective layer 115 may be a protective layer made of a thermoplastic material.

The thermoplastic material used for the composite pipe 100 may include amorphous and/or semi-crystalline plastics and may be selected to conform to certain parameters such as those relating to cost, temperature, strength, and other engineering and performance considerations. The continuous length of fully wetted tape may include fibers that have been determined to meet the design requirements of the composite pipe 100. For example, the fiber materials may be based on one or more of carbon, aramid, glass, aluminum alloy, or titanium materials. The design requirements of the composite pipe 100 may take into account the tensile strength, tensile modulus, typical density, and specific modulus of certain fibers that may be selected for the fully wetted tape. The benefits of using a continuous length of fully wetted tape may include one or more of: a combination of strength and stiffness; a high impact resistance; desirable inter-laminar sheer properties; a high strength-to-weight ratio; a resistance to corrosion; reduced manufacturing cycle times; rapid molding cycle times; improved cyclic fatigue; increased strength/pressure ratings; significantly longer parts with fewer joints or seams; an ability to use numerous resins; allowing use of numerous fibers; and allowing recycling of scrap material.

Figure 2:
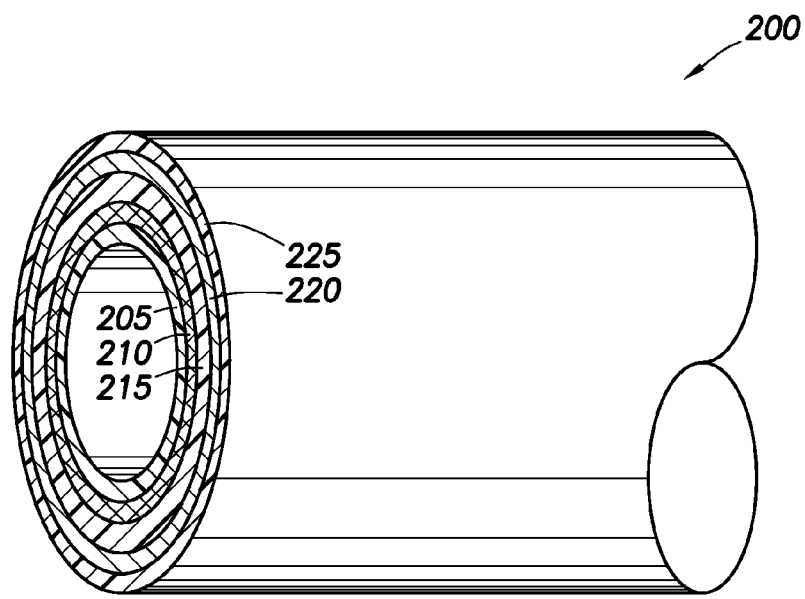
FIG. 2 is a diagram of layers of a composite pipe, in accordance with certain embodiments of the present disclosure.

FIG. 2 is a diagram of layers of a composite pipe 200 in accordance with certain embodiments of the present disclosure. The inner layer 205 may be a thermoplastic layer. The inner middle layer 210 may be a reinforcing composite tape layer. The middle layer 215 may be a thermoplastic extrudate or film layer. The outer middle layer 220 may be a stiffness layer made of a harder thermoplastic. The outer layer 225 may be a protective layer made of a thermoplastic material. One of ordinary skill in the art having the benefit of this disclosure would understand that a number of variations in layers and thicknesses may be employed to achieve particular design goals.

Figure 3:
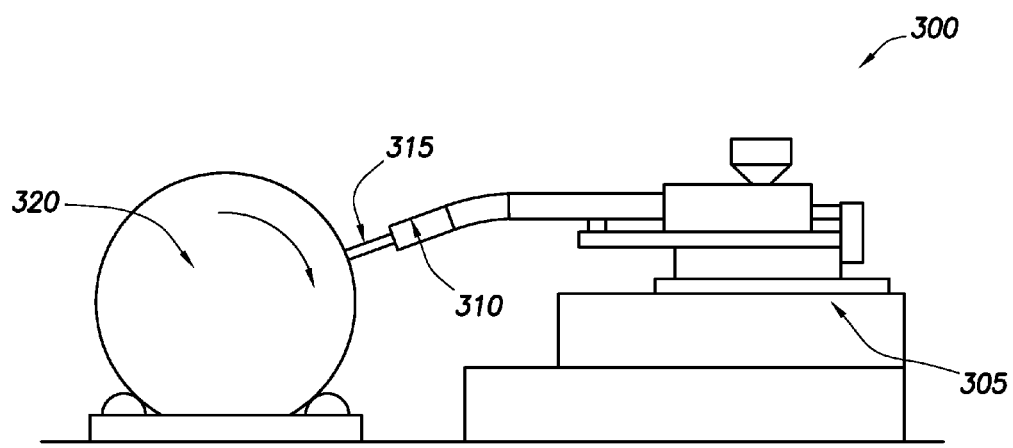
FIG. 3 is a schematic of an example manufacturing system configured for manufacturing composite pipe in accordance with certain embodiments of the present disclosure.

FIG. 3 is an example manufacturing system 300 configured for manufacturing composite pipe in accordance with certain embodiments of the present disclosure. An extruder 305 may be adapted for extruding a thermoplastic material or fully wetted tape through a die 310. The extruded thermoplastic material or fully wetted tape 315 may be applied to a rotating mandrel 320 in order to form the pipe. In alternative embodiments, the composite tape may not be extruded through the die 310 prior to being applied to the rotating mandrel 320.

In one example embodiment, the extruder 305 may apply the thermoplastic and tape layers to the pipe being formed on the mandrel 320. The mandrel 320 may be a mechanical assembly that includes a rotating drum, shaft or other cylindrical piece configured for rotation. The mechanical assembly may include expandable sections for the adjusting an outer diameter so that varying diameters of piping may be manufactured. For example, the expandable sections may include curved outer sections interiorly supported by adjustable arms. Outer sleeves of varying discrete sizes or adjustable sizes may be adapted to fit on the exterior of the expandable sections, while providing a smooth outer surface for pipe formation.

The structure of the mandrel 320 may be adapted for transferring heat to the material wound about the mandrel 320. The mandrel 320 may include an internal heat source configured for transferring heat to an outer diameter of the mandrel 320, thereby promoting curing of the piping materials from the interior. In addition or in the alternative, the mandrel 320 may include an external heat source configured for transferring heat to an outer diameter of the mandrel 320, thereby promoting curing of the piping materials from the exterior. The mandrel 320 may be a collapsible assembly so that, after the wound material is allowed to cool and form a rigid structure, the mandrel 320 may be collapsed and removed, thereby leaving the pipe in place.

Figure 4:
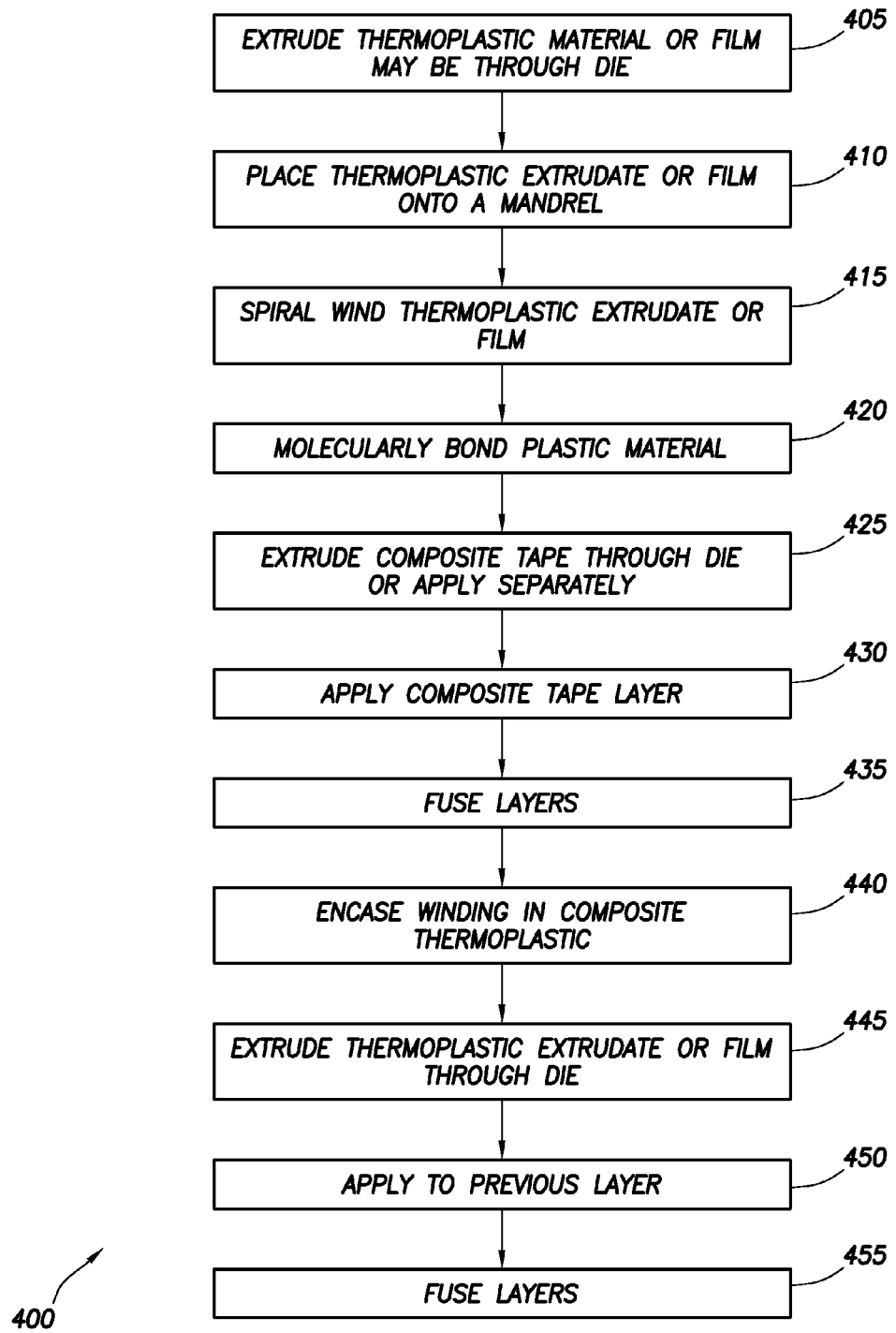
FIG. 4 is a process flow diagram illustrating a method for manufacturing composite pipe, in accordance with certain embodiments of the present disclosure.

FIG. 4 shows a process flow diagram illustrating method 400 for manufacturing composite pipe in accordance with certain embodiments of the present disclosure. Steps of method 400 are merely exemplary and, in certain embodiments, may not be performing sequentially or discretely as illustrated. In step 405, a thermoplastic material or film may be extruded through a die. In step 410, the thermoplastic extrudate or film may be placed onto a heated mandrel or another internally supported structure. In step 415, the thermoplastic extrudate or film may be spiral wound using the mandrel. In step 420, which may occur as step 415 is ongoing, the plastic material may bond molecularly.

Once the first layer is wrapped to a desired thickness, a second layer may be applied. In step 425, composite tape, which may be a fully wetted thermoplastic composite tape, may be extruded through a die. In alternative embodiments, the composite tape may be applied in the next step without having been previously extruded through the die. In step 430, composite tape layer may be applied to the first layer using filament winding. In step 435, which may occur after step 430 or as step 430 is ongoing, the second layer may fuse to the first layer by the application of heat and pressure. The winding of the second layer may be fully encased or enclosed in a composite thermoplastic at step 440.

Once the desired thickness or number of wraps of the composite tape is reached based on design criteria of the system, an additional layer of thermoplastic extrudate or film may be applied. In step 445, thermoplastic extrudate or film may be extruded through a die and, at step 450, applied to the previous layer. After or while the additional layer of thermoplastic extrudate or film is wrapped to desired thickness, it may be fused using heat and pressure at step 455. Thus, the additional layer may provide a protective outer layer. The slices of tape may bond to each other and to the layers of thermoplastic inside of and outside of the tape layer. Accordingly, all of the layers, including the thermoplastic layers and the tape layers, may be fused to provide one homogeneous piping system.

In addition to the composite tape layer, it is also possible to add additional layers, configurations of tape and corrugations to meet certain stiffness or other requirements that the design may require. If the tape layers are applied across a movable mandrel, once the mandrel has cooled, the mandrel may be collapsed and the mandrel structure may be removed. The process may result in a stress-free, homogenous structure wall. The interior diameter of the structure may consistently be exact, and the inner structure wall may be smooth. The manufacturing process lends its ability to produce composite structures such as pipe, windmill blades, poles, and construction structures.

The manufacturing method 400 may allow for portable manufacturing. The composite structure may be made using any combination of continuous thermoplastic tapes, thermoplastic liners, or thermoplastic coatings for the purpose of storing or transporting gasses, liquids, slurries, and the manufacture of other structures. The method 400 may also be used with an existing product to add strength, increase pressure capabilities, and provide corrosion resistance.

Figure 5A:
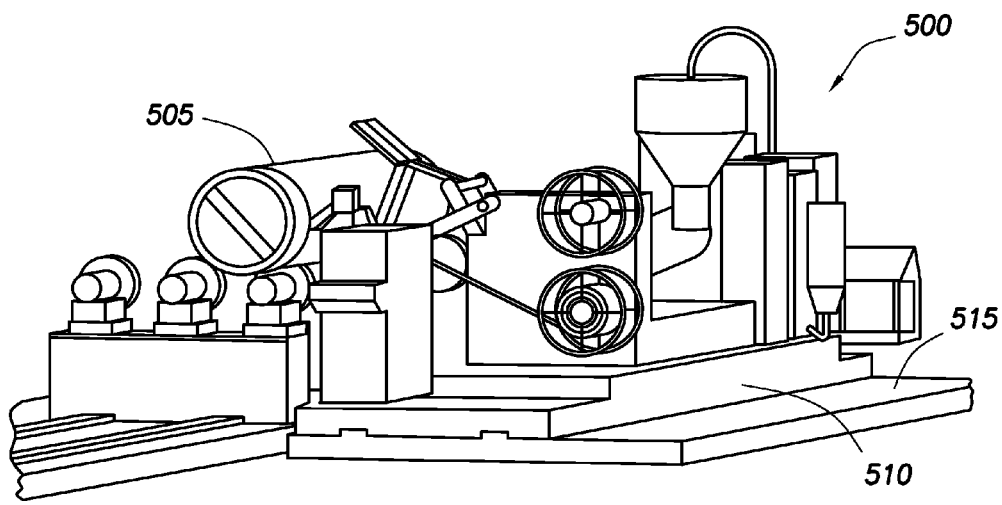
FIGS. 5A, 5B and 5C illustrate perspective views of a portable manufacturing unit, in accordance with certain embodiments of the present disclosure.
Figure 5B:
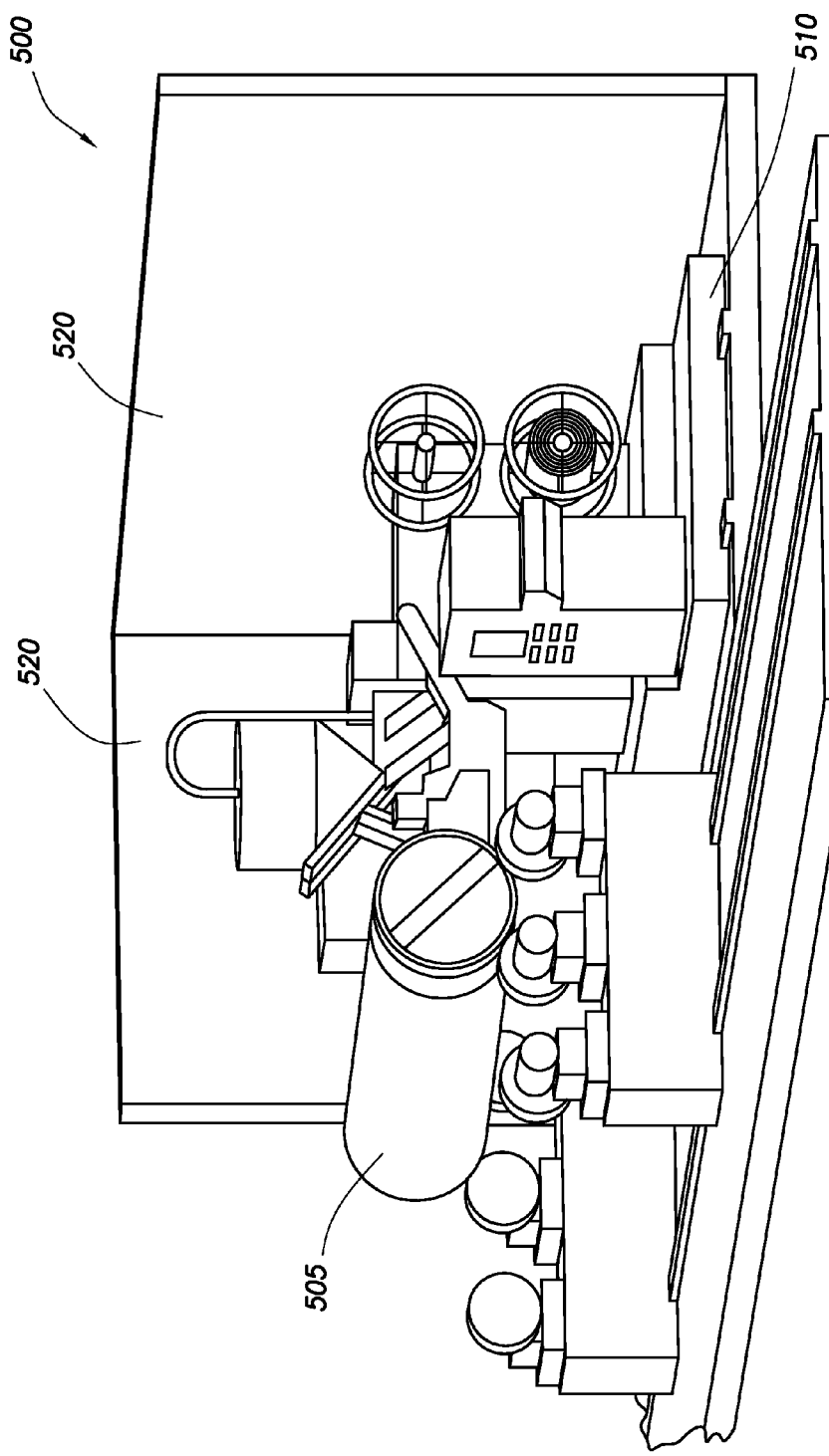
Figure 5C:
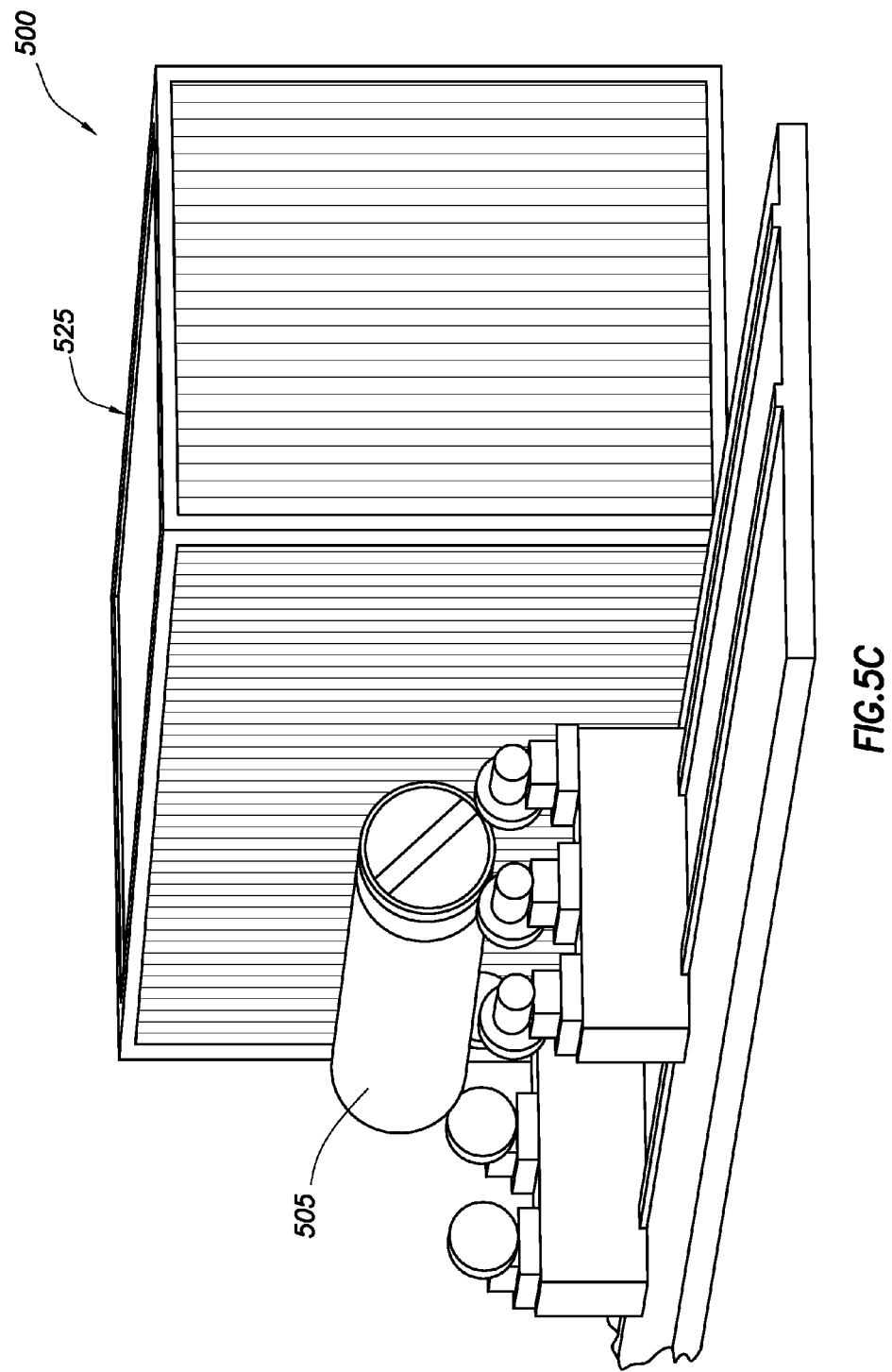

Manufacturing systems according certain embodiments of this disclosure may be configured as a portable manufacturing unit. FIGS. 5A, 5B and 5C show a perspective view of a portable manufacturing unit 500, including mandrel 505 and extruder 510, mounted on a base 515. As depicted in FIG. 5B, sides 520 of the portable unit 500 may be built around extruder 510. When the sides 520 of the portable unit 500 are completely erected, the extruder 510 may be enclosed within an enclosure 525, as shown in FIG. 5C. As indicated in the progression through FIGS. 5A, 5B and 5C, the portable manufacturing unit 500 may allow the extruder 510 and the mandrel 505 to be moved easily from one job site to another in a transportable assembly.

The portable manufacturing unit 500 may be mounted on and transported to a desired location using a trailer which may be pulled by a truck. Once the portable manufacturing unit 500 is no longer required at a given site, it may be transported back to another site. In certain embodiments, the portable manufacturing unit 500 may be configured for air transport via helicopter.

As would be appreciated by those of ordinary skill in the art, the different equipment used in the embodiments disclosed herein may be powered by any suitable power source. For example, but not by way of limitation, the equipment may be powered by a combustion engine, electric power supply which may be provided by an on-site generator. In certain embodiments, the power supply may be integrated with the manufacturing assembly such that the manufacturing assembly is a self-contained, self-powered unit.

Accordingly, certain embodiments of the present disclosure provide for: pipe production at lower costs; on-site pipe production; significant reductions of logistics costs; decreased lead times from manufacturing to readiness of pipe; an increased ability to customize piping system components based on particular project requirements; increased pressure options; increased temperature options; increased corrosion resistance; an ability to produce a variety of fittings and appurtenances; and a total low cost installed system solution.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. Also, the terms in the claims have their plain, ordinary meaning unless otherwise explicitly and clearly defined by the patentee. The indefinite articles "a" or "an," as used in the claims, are defined herein to mean one or more than one of the element that it introduces.

What is claimed is:

1. A method of manufacturing a composite homogeneous pipe, the method comprising:
   extruding a first thermoplastic material, at least in part, with an extruder;
   winding the first thermoplastic material to form a thermoplastic inner layer, at least in part, with a mandrel;
   winding a composite tape to form a composite tape layer exterior to the thermoplastic inner layer, at least in part, with the mandrel;
   forming at least one of a thermoplastic extrudant or film layer exterior to the composite tape layer;
   forming a stiffness layer exterior to the at least one of thermoplastic extrudant or film layer, wherein the stiffness layer comprises a second thermoplastic material harder than the first thermoplastic material;
   forming a protective layer exterior to the stiffness layer, at least in part, with the mandrel;
   applying heat from an external heat source and pressure to the protective layer to fuse the protective layer to the stiffness layer;
   applying heat from an internal heat source of the mandrel to an outer diameter of the mandrel, wherein the protective layer, the stiffness layer, the thermoplastic extrudant or film layer, the composite tape layer and the thermoplastic inner layer fuse to provide the composite homogeneous pipe; and
   wherein the extruder and the mandrel are configured as a portable unit operable to manufacture a composite pipe.

2. The method of manufacturing a composite homogeneous pipe of claim 1, wherein the tape layer is comprised of a fully wetted tape.

3. The method of manufacturing a composite homogeneous pipe of claim 1, wherein the tape of the tape layer is enclosed in a thermoplastic.

4. The method of manufacturing a composite homogeneous pipe of claim 1, wherein the protective layer is comprised of a thermoplastic.

* * * * *